(12) United States Patent
Sobanski (10) Patent No.: US 11,603,765 B1
(45) Date of Patent: Mar. 14, 2023

(54) AIRFOIL ASSEMBLY WITH FIBER-REINFORCED COMPOSITE RINGS AND TOOTHED EXIT SLOT

(71) Applicant: RAYTHEON TECHNOLOGIES CORPORATION, Farmington, CT (US)

(72) Inventor: Jon E. Sobanski, Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/377,618

(22) Filed: Jul. 16, 2021

(51) Int. Cl.
*F01D 5/18* (2006.01)
*F01D 5/14* (2006.01)
(Continued)

(52) U.S. Cl.
CPC ............. *F01D 5/187* (2013.01); *F01D 5/081* (2013.01); *F01D 5/14* (2013.01); *F01D 5/147* (2013.01); *F01D 5/18* (2013.01); *F01D 5/282* (2013.01); *F01D 9/041* (2013.01); *F05D 2220/323* (2013.01); *F05D 2240/305* (2013.01); *F05D 2240/306* (2013.01);
(Continued)

(58) Field of Classification Search
CPC .......... F01D 5/187; F01D 5/081; F01D 5/282; F01D 9/041; F01D 5/14; F01D 5/147; F01D 5/18; F05D 2220/323; F05D 2240/305; F05D 2240/306; F05D 2260/2214; F05D 2300/601; F05D 2300/603
See application file for complete search history.

(56) References Cited

U.S. PATENT DOCUMENTS 4,180,373 A * 12/1979 Moore ................... F01D 5/187
                                                    415/115
4,616,976 A * 10/1986 Lings ..................... F01D 5/186
                                                    415/114

(Continued)

FOREIGN PATENT DOCUMENTS

EP          1126135         8/2001
EP          3048254         7/2016

OTHER PUBLICATIONS

European Search Report for European Patent Application No. 22185172.8 dated Dec. 16, 2022.

*Primary Examiner* — Igor Kershteyn
*Assistant Examiner* — Brian Christopher Delrue
(74) *Attorney, Agent, or Firm* — Carlson, Gaskey & Olds, P.C.

(57) ABSTRACT

An airfoil assembly includes first and second fiber-reinforced composite airfoil rings that each have inner and outer platform sections, a suction side wall extending between the inner and outer platforms, a pressure side wall extending between the inner and outer platforms, and suction and pressure side mate faces along, respectively, edges of the suction and pressure side walls. The suction side mate face of the first fiber-reinforced composite airfoil ring and the pressure side mate face of the second fiber-reinforced composite airfoil ring mate at an interface to form an airfoil that circumscribes an internal cavity. A least one of the suction or pressure side mate faces includes protrusions along a trailing edge of the airfoil. The protrusions define a toothed exit slot for emitting cooling air from the internal cavity.

18 Claims, 6 Drawing Sheets

(51) Int. Cl.
*F01D 5/28* (2006.01)
*F01D 5/08* (2006.01)
*F01D 9/04* (2006.01)

(52) U.S. Cl.
CPC ............... *F05D 2260/2214* (2013.01); *F05D 2300/601* (2013.01); *F05D 2300/603* (2013.01)

(56) References Cited

U.S. PATENT DOCUMENTS

| | | | |
|---|---|---|---|
| 5,538,394 A * | 7/1996 | Inomata | F28F 3/02 |
| | | | 415/115 |
| 7,093,359 B2 | 8/2006 | Morrison et al. | |
| 8,052,378 B2 * | 11/2011 | Draper | F01D 5/186 |
| | | | 415/121.2 |
| 9,004,866 B2 * | 4/2015 | Lee | F01D 5/187 |
| | | | 416/97 R |
| 9,194,236 B2 * | 11/2015 | Nakamata | F01D 5/187 |
| 9,915,154 B2 * | 3/2018 | Berczik | F01D 5/284 |
| 10,100,645 B2 * | 10/2018 | Lewis | F01D 5/288 |
| 10,196,920 B2 * | 2/2019 | Subramanian | C23C 4/04 |
| 10,301,954 B2 * | 5/2019 | Allen | F01D 9/065 |
| 10,337,332 B2 * | 7/2019 | Auxier | F01D 9/041 |
| 10,358,939 B2 | 7/2019 | Walston et al. | |
| 10,844,732 B2 | 11/2020 | Harding | |
| 2016/0281517 A1 | 9/2016 | Kim et al. | |
| 2018/0179906 A1 | 6/2018 | Schetzel et al. | |
| 2020/0003060 A1 * | 1/2020 | Rodriguez | F01D 5/187 |

* cited by examiner

AIRFOIL ASSEMBLY WITH FIBER-REINFORCED COMPOSITE RINGS AND TOOTHED EXIT SLOT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil assembly according to an example of the present disclosure includes first and second fiber-reinforced composite airfoil rings each comprised of inner and outer platform sections, a suction side wall that extends between the inner and outer platforms, a pressure side wall that extends between the inner and outer platforms, and suction and pressure side mate faces along, respectively, edges of the suction side wall and the pressure side wall. The suction side mate face of the first fiber-reinforced composite airfoil ring and the pressure side mate face of the second fiber-reinforced composite airfoil ring mate at an interface such that the suction side wall of the first fiber-reinforced composite airfoil ring and the pressure side wall of the second fiber-reinforced composite airfoil ring together form an airfoil that circumscribes an internal cavity. At least one of the suction or pressure side mate faces includes protrusions along a trailing edge of the airfoil. The protrusions define a toothed exit slot for emitting cooling air from the internal cavity.

In a further embodiment of any of the foregoing embodiments the protrusions are exclusively on the pressure side mate face.

In a further embodiment of any of the foregoing embodiments the protrusions are on both the suction and pressure side mate faces.

In a further embodiment of any of the foregoing embodiments the protrusions on the suction side mate face are interdigitated with the protrusions on the pressure side mate face.

In a further embodiment of any of the foregoing embodiments the protrusions have a rectangular cross-sectional geometry.

In a further embodiment of any of the foregoing embodiments the protrusions have a rounded-off triangular cross-sectional geometry.

In a further embodiment of any of the foregoing embodiments the suction and pressure side mate faces each taper at the trailing edge.

In a further embodiment of any of the foregoing embodiments the first and second fiber-reinforced composite airfoil rings are arranged about an engine central axis, and the protrusions are axially elongated.

In a further embodiment of any of the foregoing embodiments the first and second fiber-reinforced composite airfoil rings are arranged about an engine central axis, and the protrusions are axially tapered.

A gas turbine engine according to an example of the present disclosure includes a compressor section, a combustor in fluid communication with the compressor section, and a turbine section in fluid communication with the combustor. The turbine section has a plurality of airfoil assemblies disposed about a central axis of the gas turbine engine. Each of the airfoil assemblies includes first and second fiber-reinforced composite airfoil rings each comprised of inner and outer platform sections, a suction side wall that extends between the inner and outer platforms, a pressure side wall that extends between the inner and outer platforms, and suction and pressure side mate faces along, respectively, edges of the suction side wall and the pressure side wall. The suction side mate face of the first fiber-reinforced composite airfoil ring and the pressure side mate face of the second fiber-reinforced composite airfoil ring mate at an interface such that the suction side wall of the first fiber-reinforced composite airfoil ring and the pressure side wall of the second fiber-reinforced composite airfoil ring together form an airfoil that circumscribes an internal cavity. At least one of the suction or pressure side mate faces include protrusions along a trailing edge of the airfoil. The protrusions define a toothed exit slot for emitting cooling air from the internal cavity.

In a further embodiment of any of the foregoing embodiments the protrusions are exclusively on the pressure side mate face.

In a further embodiment of any of the foregoing embodiments the protrusions are on both the suction and pressure side mate faces.

In a further embodiment of any of the foregoing embodiments the protrusions on the suction side mate face are interdigitated with the protrusions on the pressure side mate face.

In a further embodiment of any of the foregoing embodiments the protrusions have a rectangular cross-sectional geometry.

In a further embodiment of any of the foregoing embodiments the protrusions have a rounded-off triangular cross-sectional geometry.

In a further embodiment of any of the foregoing embodiments the suction and pressure side mate faces each taper at the trailing edge.

In a further embodiment of any of the foregoing embodiments the first and second fiber-reinforced composite airfoil rings are arranged about an engine central axis, and the protrusions are axially elongated.

In a further embodiment of any of the foregoing embodiments the first and second fiber-reinforced composite airfoil rings are arranged about an engine central axis, and the protrusions are axially tapered.

A method of fabricating a fiber-reinforced airfoil ring according to an example of the present disclosure includes providing a mandrel that has a mandrel suction side and mandrel pressure side, and forming an endless braid around the mandrel. The endless braid conforms to the mandrel suction side and the mandrel pressure side. The endless braid is then consolidated with a matrix material. The mandrel is then removed, leaving the consolidated endless braid as a fiber-reinforced airfoil ring that has a suction side wall that extends between inner and outer platforms, a pressure side wall that extends between the inner and outer platforms, and suction and pressure side mate faces along, respectively, edges of the suction side wall and the pressure side wall, and at least one of the suction or pressure side mate faces includes protrusions along a trailing edge.

In a further embodiment of any of the foregoing embodiments the protrusions are exclusively on the pressure side mate face.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
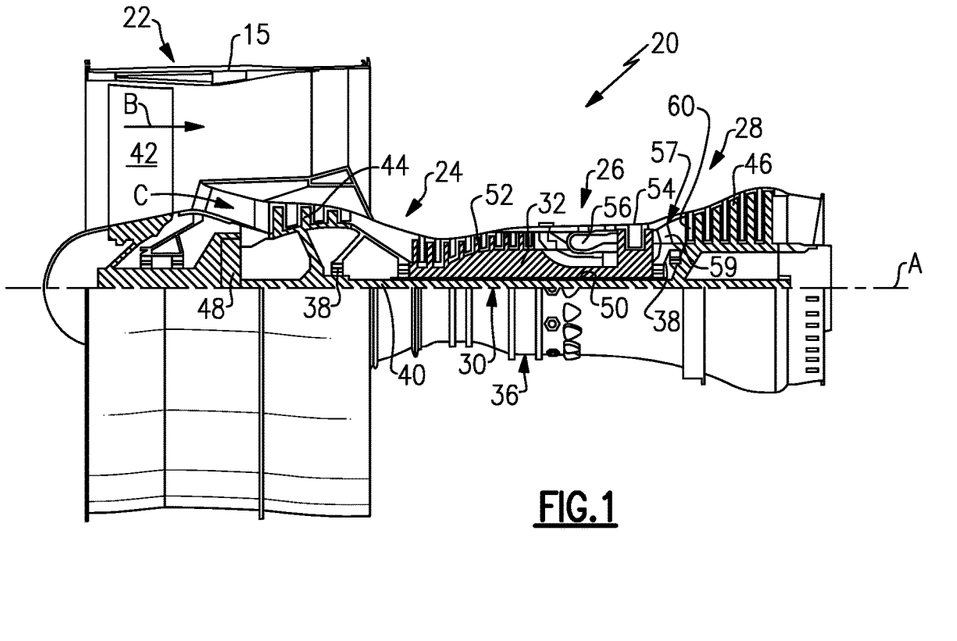
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
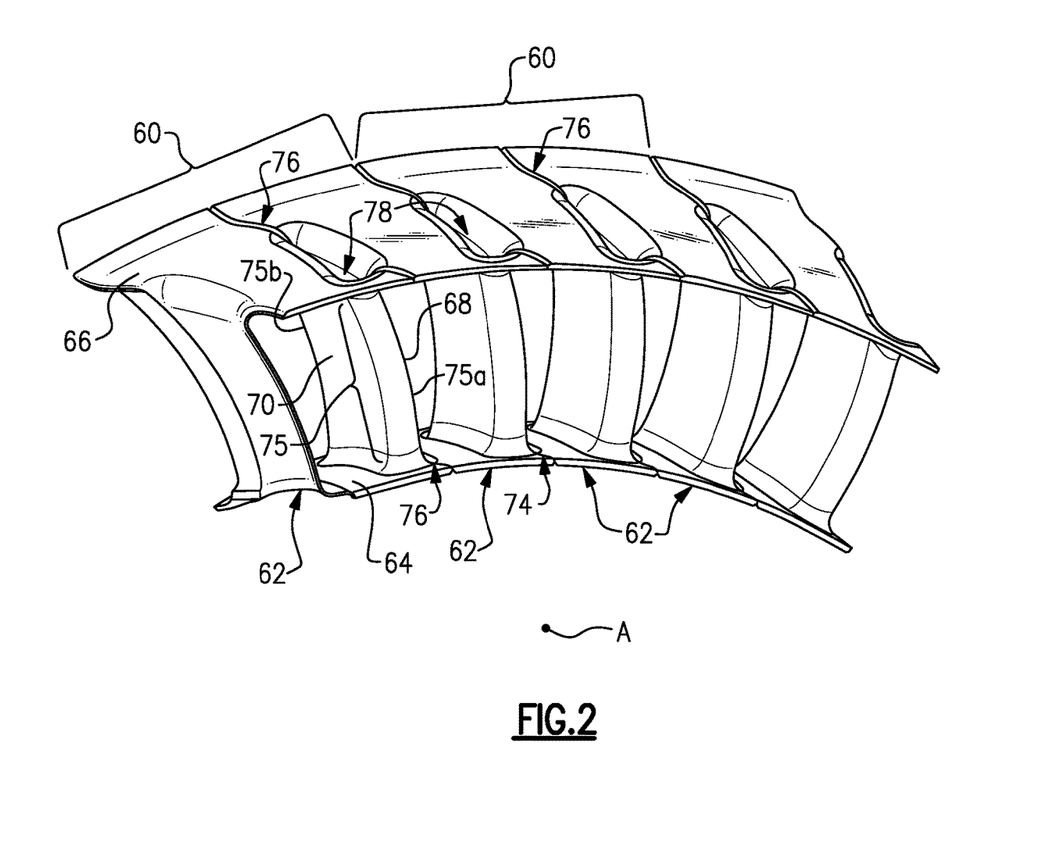
FIG. 2 illustrates a vane assembly.

FIG. 2 illustrates vane assemblies 60 from the turbine section 28 of the engine 20 (see also FIG. 1). It is to be understood that although the examples herein are discussed in context of a vane assembly from the turbine section 28, the examples can be applied to vanes in other sections of the engine 20. The vane assemblies 60 are generally arranged about the engine central axis A to form a full row of vanes and may be supported in the engine 20 via support hardware (not shown).

Figure 3:
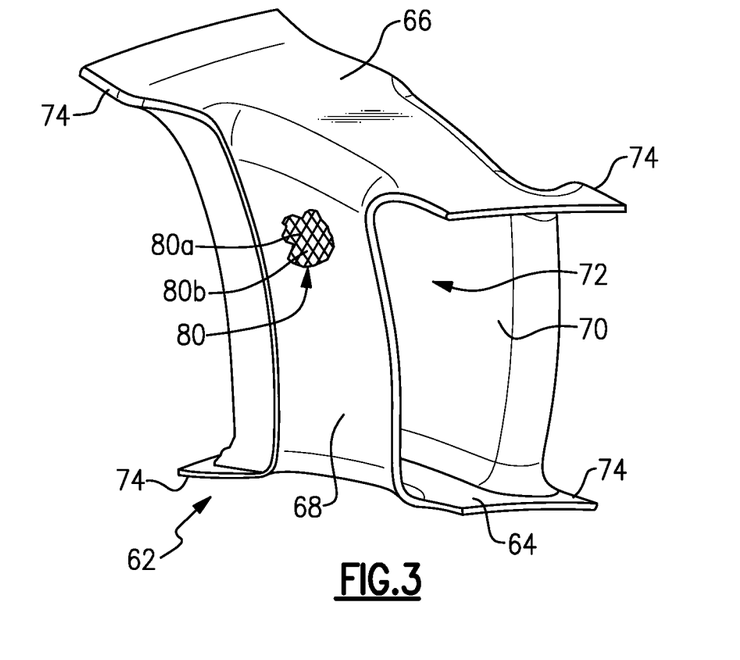
FIG. 3 illustrates a fiber-reinforced composite airfoil ring.

Each vane assembly 60 includes a pair of fiber-reinforced composite airfoil rings 62 that are identical or substantially identical, a representative one of which is shown in an isometric view in FIG. 3. Each ring 62 is composed of inner and outer platform sections 64/66, a suction side wall 68 that extends between the inner and outer platform sections 64/66, and a pressure side wall 70 that also extends between the inner and outer platform sections 64/66. The outwardly-facing edges of the rings 62 along the inner and outer platform sections 64/66, the suction side wall 68, and the pressure side wall 70 include mate faces 74. The mate faces 74 on the suction side wall 68 may be referred to as suction side mate faces 74, and the mate faces 74 on the pressure side wall 70 may be referred to as pressure side wall mate faces 74. Together, the inner and outer platform sections 64/66, the suction side wall 68, and the pressure side wall 70 form a ring that circumscribes an open throat 72 through which the combustion gases will expand in the core gas path.

Referring again to FIG. 2, in each vane assembly 60 a first one of the rings 62 mates with a second, adjacent one of the rings 62 in an interface 76. The interface 76 refers to the boundary region of the mate faces 74 when the mate faces 74 are aligned substantially flush with each other in their final assembled position. The suction side wall 68 of the first ring 62 and the pressure side wall 70 of the second ring 62 together form an airfoil 75 that circumscribes an internal cavity 78.

The airfoil 75 defines a leading edge 75a and a trailing edge 75b. As an example, the trailing edge 75b has an arced profile along its extent from the inner platform section 64 to the outer platform section 66, and the arced profile is convex in the aft direction. It is to be understood, however, that the profile of the trailing edge 75b is not particularly limited.

In the illustrated example, the interface 76 runs along the inner and outer platform sections 64/66 and along the leading and trailing edges 75a/75b of the airfoil 75. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Figure 4:
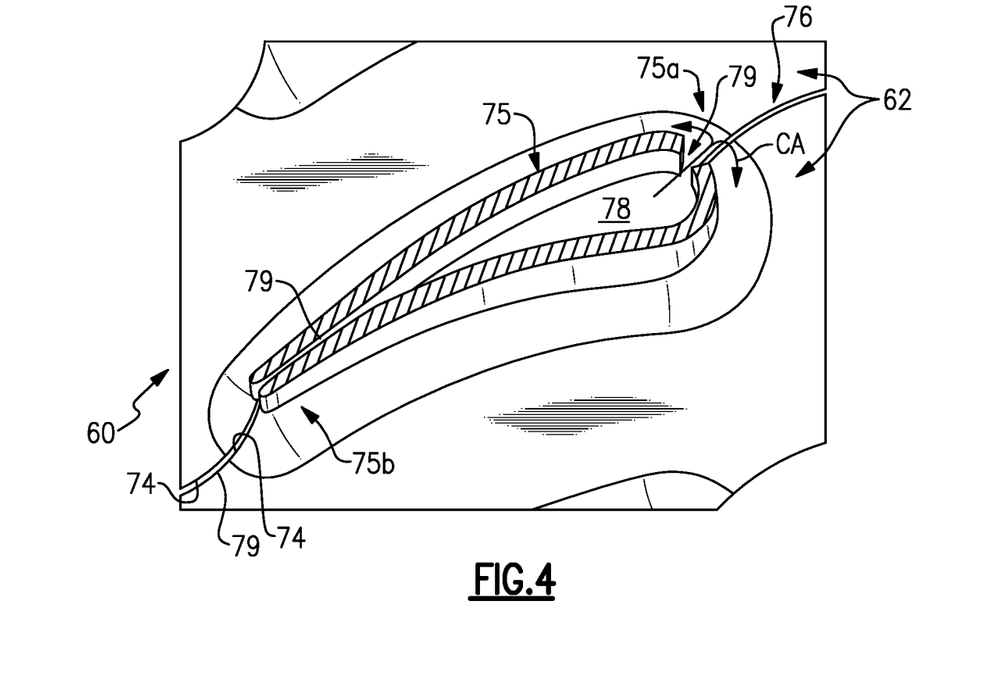
FIG. 4 illustrates a sectioned view of a vane assembly.

FIG. 4 illustrates a sectioned view of the airfoil assembly 60 taken through the airfoil 75. Although the mate faces 74 may meet at some locations in the interface 76, one or more sections the interface 76 include a gap 79 between the adjacent mate faces 74. For example, the gap 79 may be substantially co-extensive with the full length of the interface 76 and thus run along the inner and outer platform face 64/66 and along the leading and trailing edges 75a/75b of the airfoil 75. Cooling air (CA), such as bleed air from the compressor section 24 of the engine 20, is provided to the internal cavity 78. The gap 79 along the airfoil 75 serves as a passage for emission of the cooling air (CA) from the internal cavity 78 to the exterior surfaces of the airfoil 75 for cooling thereof. In this regard, the location of the interface 76 on the airfoil 75 may be varied, depending on where cooling air is desired. As an example, the interface 76 runs along the leading edge 75a, along the trailing edge 75b, or both. If not both, the interface 76 may run along either the suction or pressure side walls 68/70. Most typically, however, the interface 76 will at least run near the leading and trailing edges 75a/75b, as the geometry may otherwise interfere with assembly.

Optionally, selected sections of the mate faces 74 may be contoured such that the gap 79 modulates flow of the cooling air (CA). For instance, as shown in FIG. 4, the mate faces 74 at the leading edge 75a are sloped such that the gap 79 diverges from the internal cavity 78 to the exterior surface of the airfoil 75. The divergence facilitates diffusing the cooling air (CA) so that it leaks along the exterior surfaces for film cooling rather than jetting into the core gas flow.

On the inner and outer platform sections 64/66, the interface 76 extends from the leading edge 75a of the airfoil 75 to the forward edge of the inner and outer platform sections 64/66 and from the trailing edge 75b of the airfoil 75 to the aft edge of the inner and outer platform sections 64/66. Thus, in comparison to conventional platforms that mate over the full length at the circumferential edges of the platform, the airfoil assembly 60 reduces the overall mate face length, thereby facilitating reductions in leakage in comparison to relatively longer mate interfaces and reductions in weight from relatively shorter seals along the mating interfaces.

Each ring 62 is an endless loop in that the inner and outer platform sections 64/66, suction side wall 68, and pressure side wall 70 constitute a unitary body. As an example, the ring 62 is fabricated of a fiber-reinforced composite 80 (shown in partial cutaway view in FIG. 3). The fiber-reinforced composite 80 is comprised of a network of fiber tows 80a disposed in a matrix 80b. A fiber tow is a bundle of filaments. As an example, a single tow may have several thousand filaments. The tows 80a may be arranged in a fiber architecture, which refers to an ordered arrangement of the tows 80a relative to one another. For instance, the fiber structure is a braided architecture (e.g., bi- or tri-axial braid). In the illustrated example in FIG. 3, the fiber tows 80a are provided as an endless braid around the throat 72. The endless braid thus resembles a woven sleeve that has no seams.

The fiber-reinforced composite 80 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum.

Figure 5:
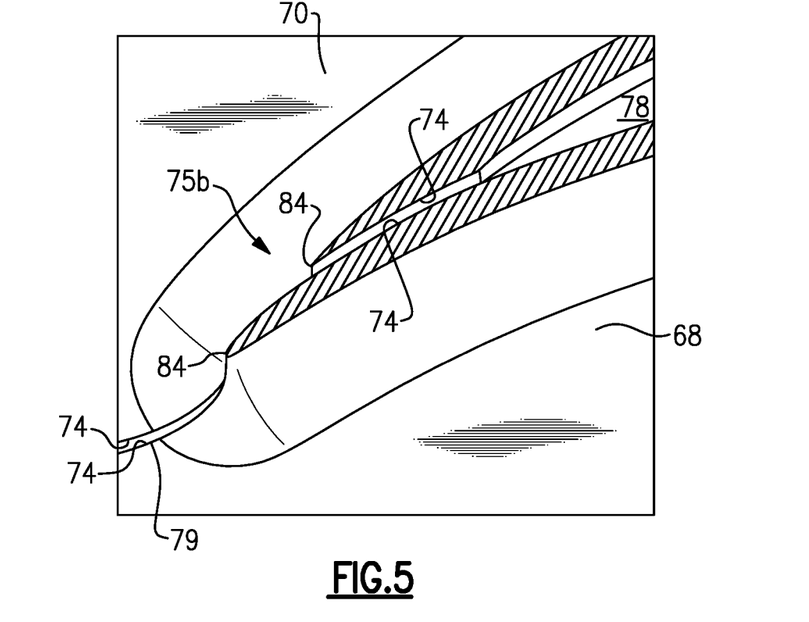
FIG. 5 illustrates a sectioned view through the trailing edge of another example of a vane assembly.

The rings 62 enable additional features that in other airfoil designs would be challenging to achieve with the expected performance requirements, prohibitively expensive, and/or impractical to manufacture. For example, as illustrated in FIG. 5, the suction and pressure side mate faces 74 along the trailing edge 75b each taper to a thin terminal edge 84. For instance, the terminal edges 84 are knife edges, although they may alternatively be radiused to facilitate avoidance of erosion or burn-up of the knife edge.

Such a thin terminal edge 84 is enabled by the annular structure of the rings 62 and the split design of the airfoil 75. As a comparison, a "one-piece" airfoil may be formed by a braided fiber sleeve around a mandrel and then densifying the airfoil with a matrix. The mandrel is removed, leaving an internal cavity in the airfoil. In this case, the fiber sleeve is an endless loop around the internal cavity, i.e., the sleeve is oriented generally radially. In this radial orientation, the fibers must sharply bend around the trailing edge. The geometry of the trailing edge is thus limited by the minimum bend radius of the fibers to avoid fiber breakage.

With the ring 62 and split design of the airfoil 75, however, the fiber sleeve is an endless loop around the throat 72 rather than the internal cavity 78, i.e., the sleeve is oriented generally axially. In this axial orientation the fibers bend at the platforms 64/66 but not at the trailing edge 75b. The geometry of the trailing edge 75b is, therefore, not limited by the minimum bending radius and can thereby be formed with a knife-edge or low-radius profile.

The geometry of a trailing edge impacts aerodynamic efficiency, and the ability to have a knife-edge or low-radius profile thus facilitates improved aerodynamic efficiency. Moreover, to the extent that knife-edges, low-radius profile geometries, or cooling holes would otherwise be produced by machining an airfoil, the ability to form the ring 62 to the net or near-net design of a knife-edge or low-radius profile eliminates or reduces machining. Also, as some airfoils includes "noodles" in the trailing edge to occupy regions where fiber layers diverge from each other, such regions and the corresponding noodles are eliminated by the split design of the airfoil 75. Comparable designs that utilize a continuous bent fabric trailing edge (such as a mandrel configuration) may be prone to cracking from themo-mechanical fatigue or low-cycle fatigue conditions. In contrast, the airfoil 75 cannot crack or split at the trailing edge 75b because there is already the geometric split.

Figure 6:
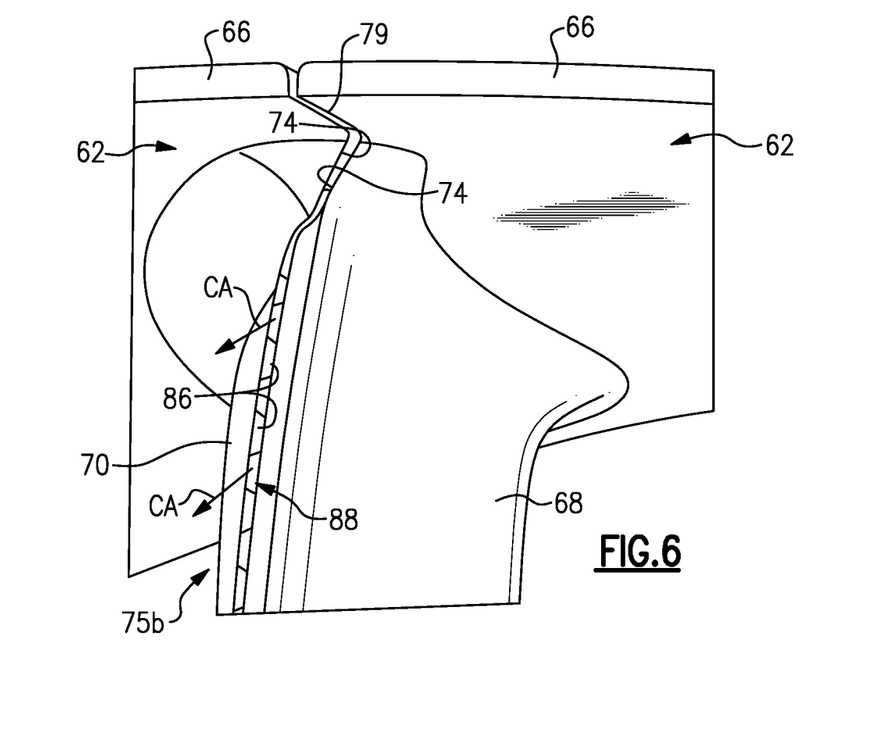
FIG. 6 illustrates a view of an exit slot of a vane assembly.

In further examples, as shown in FIG. 6, the mate faces 74 along the trailing edge 75b of at least one of the suction or pressure side walls 68/70 includes protrusions 86. For example, the protrusions 86 are elongated in the axial direction. FIG. 6 illustrates an axial view looking forward at the trailing edge 75b. The protrusions 86 define a toothed exit slot 88 for emitting cooling air CA from the internal cavity 78 through the trailing edge 75b. In this regard, the protrusions 86 facilitate guiding the flow of the cooling air and also provide surface area for thermal transfer from the airfoil 75 to the cooling air. For instance, over a given radial length along a trailing edge, the profile of the toothed exit slot 88 will have a higher surface area than an exit slot that is not toothed (i.e., the mate faces are flat).

Figure 7A:
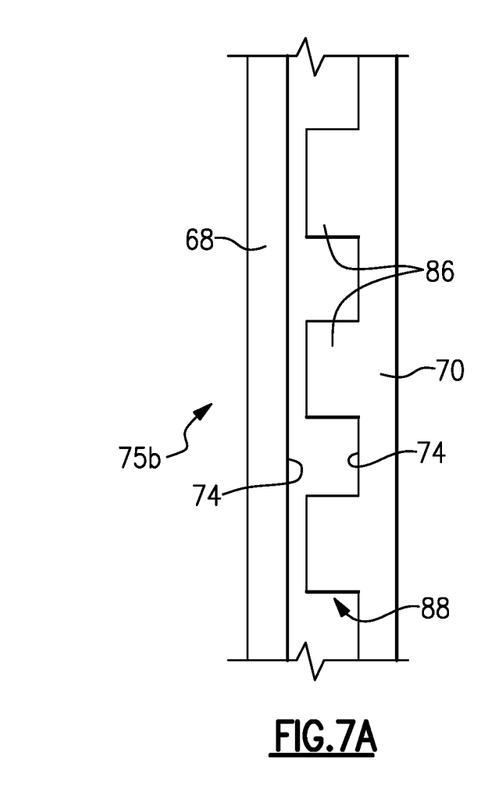
FIG. 7A illustrates an exit slot that has rectangular protrusions.
Figure 7B:
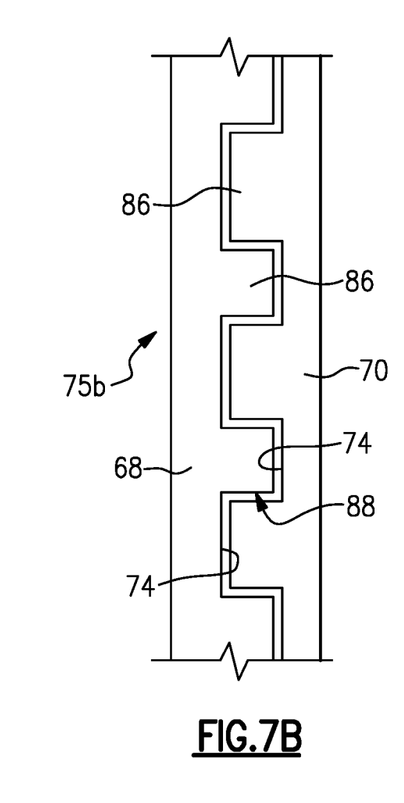
FIG. 7B illustrates an exit slot that has interdigitated protrusions.
Figure 7C:
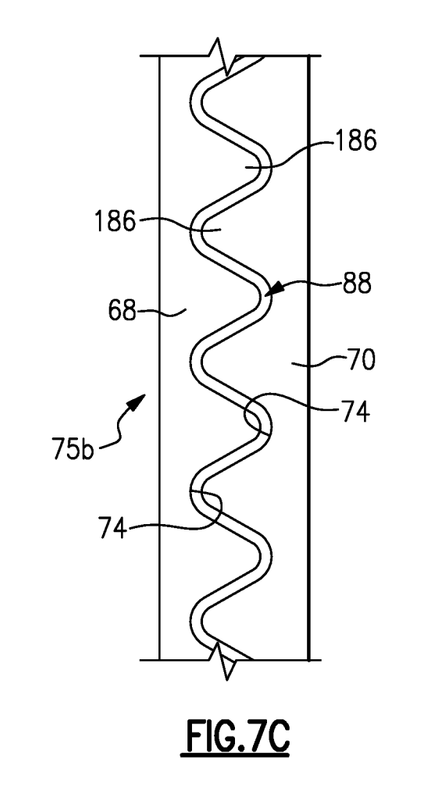
FIG. 7C illustrates an exit slot that has rounded-off triangular interdigitated protrusions.

The geometry, size, location, and number of the protrusions 86 can be varied to further tailor the flow and heat transfer characteristics of the exit slot 88. In one example shown in a representative view in FIG. 7A, the protrusions 86 are rectangular and are exclusively on the mate face 74 of the pressure side wall 70. For instance, the suction side of a trailing edge typically experiences a greater amount of erosion and deterioration than the pressure side. Therefore, having the protrusions 86 on the pressure side wall 70 facilitates avoidance of erosion and deterioration of the protrusions 86. If erosion and deterioration are not of concern, or if flow and/or heat transfer factors require, the mate face 74 of the suction side wall 68 may also have protrusions 86, an example of which is shown in FIG. 7B. In this case, the protrusions 86 on the suction side wall 68 are radially offset from the protrusions 86 on the pressure side wall 70 such that the protrusions 86 are interdigitated. Thus, the exit slot 88 maintains a substantially uniform width along its extent. In another example illustrated in FIG. 7C, the protrusions 186 are interdigitated and have a rounded-off triangular cross-sectional geometry. Such a geometry eliminates relatively sharp corners that might otherwise be vulnerable to erosion.

Figure 8:
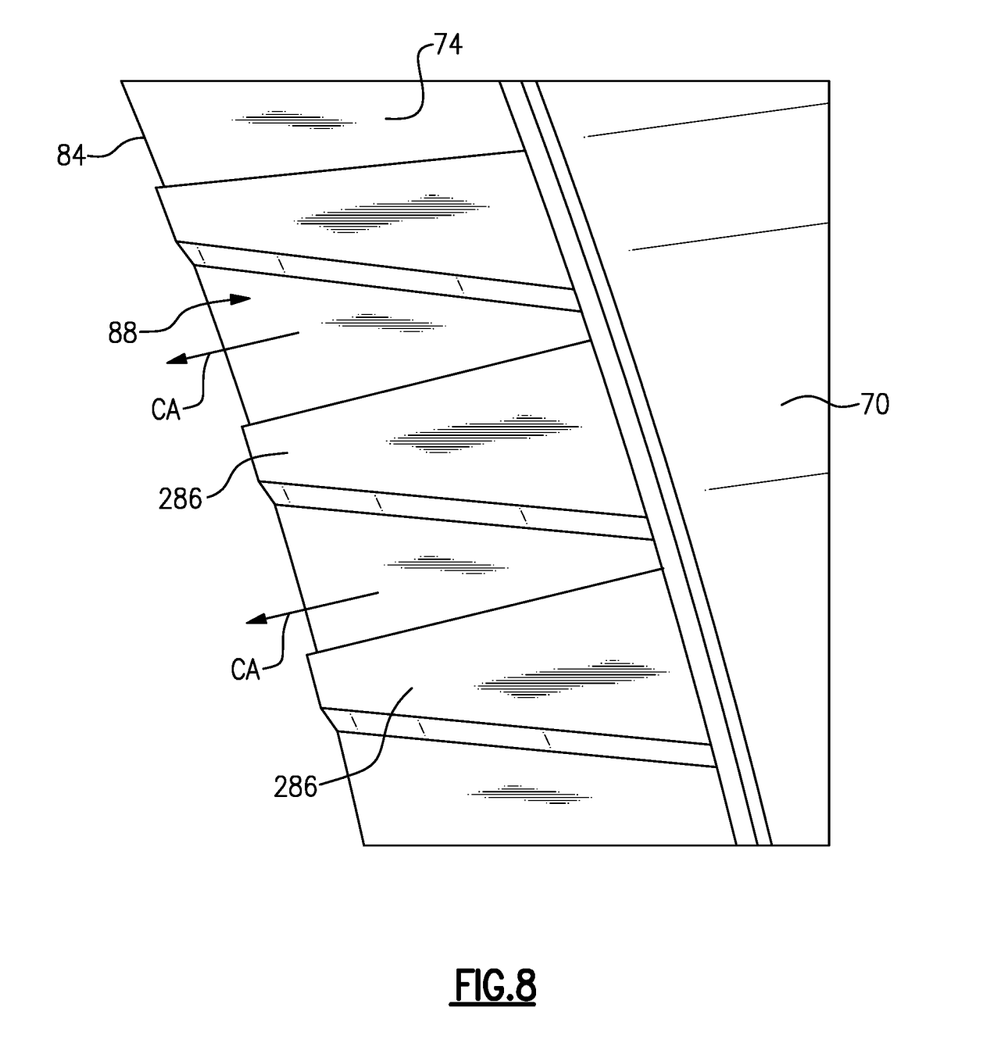
FIG. 8 illustrates protrusions that are axially tapered.

In a further example illustrated in FIG. 8, the protrusions 286 are axially tapered toward the terminal edge 84. The channels between the protrusions 286 thus diverge, causing diffusion of the cooling air CA flowing through the exit slot 88 as it flows down the channels. Such diffusion facilitates an increase in static pressure. The cooling air provided into the cavity does not, therefore, need to be as high of a pressure differential relative to the gaspath, which permits more freedom for secondary airflow routing and cooling options.

Figure 9:
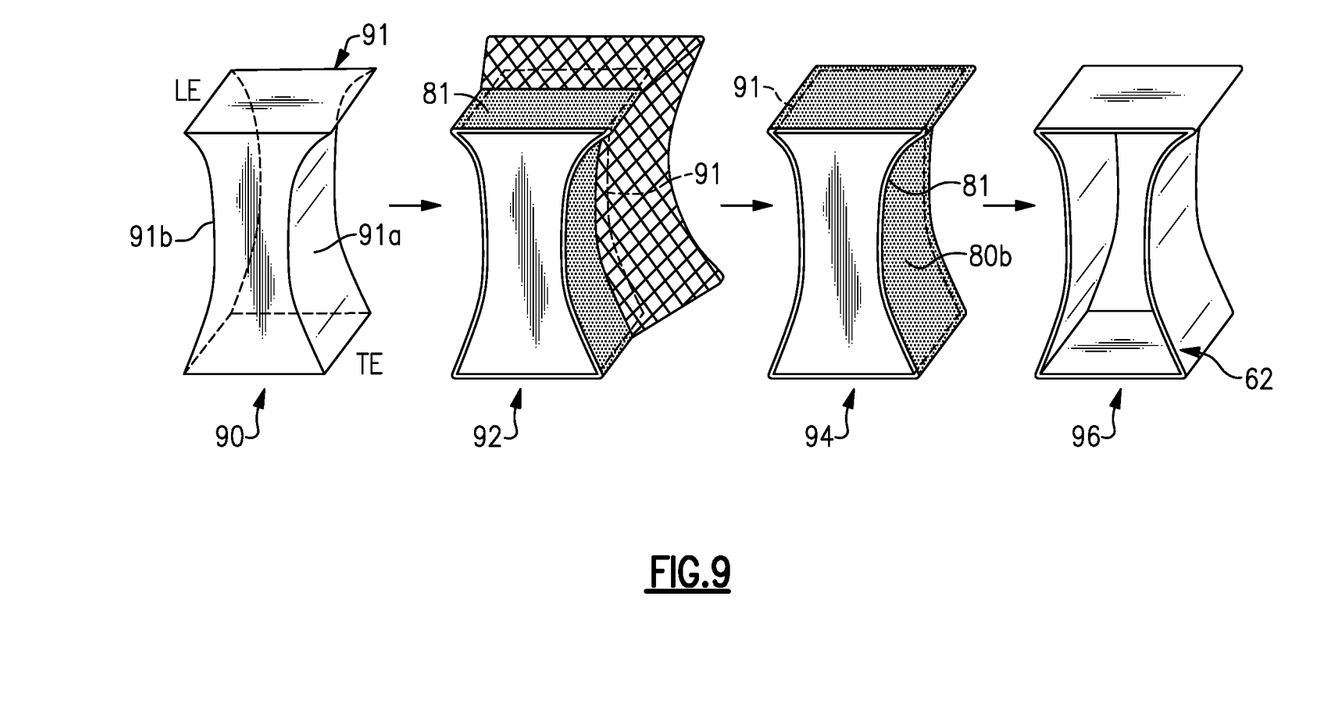
FIG. 9 illustrates a method of fabricating a fiber-reinforced composite airfoil ring.

FIG. 9 illustrates an example method of fabricating the fiber-reinforced airfoil ring 62. At 90, the method includes providing a mandrel 91 that has a mandrel suction side 91a and mandrel pressure side 91b. As will be appreciated, the mandrel 91 is shown representatively and the actual geometry will reflect the design shape of the rings 62. For example, the mandrel 91 is made of carbon graphite, although it may alternatively be made of another material that has sufficient strength and durability for the processing. At 92, the method includes forming an endless braid 81 around the mandrel 91. For instance, the forming includes weaving the braid 81 using a loom or other known device. The endless braid 81 conforms to the mandrel suction side 91a and the mandrel pressure side 91b. At 94 the method includes consolidating the endless braid 81 with the matrix material 80b. For example, the consolidation includes chemical vapor infiltration of the endless braid 81 with the matrix material 80b. The consolidation is not limited, however, and other processes such as, but not limited to, polymer infiltration and pyrolysis may additionally or alternatively be used. Finally, at 96 the method includes removal of the mandrel 91, leaving the final ring 62. As an example, the mandrel 91 may be slid out of the ring 62. Alternatively, the mandrel 91 may be provided in several pieces that facilitate removal.

Although not limited, the protrusions 86/186/286 may also be formed during the fabrication of the ring 62. For instance, the trailing edge region may initially be fabricated to an over-thickness and then the protrusions 86/186/286 may be formed by machining. In another example, laminated fiber plies may be provided in the trailing edge region and then formed to final or near final shape by an outer mold tool.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil assembly comprising:
    first and second fiber-reinforced composite airfoil rings each comprised of inner and outer platform sections, a suction side wall extending between the inner and outer platforms, a pressure side wall extending between the inner and outer platforms, and suction and pressure side mate faces along, respectively, edges of the suction side wall and the pressure side wall, wherein when the first and second fiber-reinforced composite airfoil rings are brought together the suction side mate face of the first fiber-reinforced composite airfoil ring and the pressure side mate face of the second fiber-reinforced composite airfoil ring mate at an interface such that the suction side wall of the first fiber-reinforced composite airfoil ring and the pressure side wall of the second fiber-reinforced composite airfoil ring together form an airfoil that circumscribes an internal cavity, at least one of the suction or pressure side mate faces including protrusions along a trailing edge of the airfoil such that when the first and second fiber-reinforced composite airfoil rings are brought together the protrusions define a toothed exit slot through the trailing edge for emitting cooling air from the internal cavity.

2. The airfoil assembly as recited in claim 1, wherein the protrusions are exclusively on the pressure side mate face.

3. The airfoil assembly as recited in claim 1, wherein the protrusions are on both the suction and pressure side mate faces.

4. The airfoil assembly as recited in claim 3, wherein the protrusions on the suction side mate face are interdigitated with the protrusions on the pressure side mate face.

5. The airfoil assembly as recited in claim 1, wherein the protrusions have a rectangular cross-sectional geometry.

6. The airfoil assembly as recited in claim 1, wherein the protrusions have a rounded-off triangular cross-sectional geometry.

7. The airfoil assembly as recited in claim 1, wherein the suction and pressure side mate faces each taper at the trailing edge.

8. The airfoil assembly as recited in claim 1, wherein the first and second fiber-reinforced composite airfoil rings are arranged about an engine central axis, and the protrusions are axially elongated.

9. The airfoil assembly as recited in claim 1, wherein the first and second fiber-reinforced composite airfoil rings are arranged about an engine central axis, and the protrusions are axially tapered.

10. A gas turbine engine comprising:
    a compressor section;
    a combustor in fluid communication with the compressor section; and
    a turbine section in fluid communication with the combustor, the turbine section having a plurality of airfoil assemblies disposed about a central axis of the gas turbine engine, each of the airfoil assemblies includes:
        first and second fiber-reinforced composite airfoil rings each comprised of inner and outer platform sections, a suction side wall extending between the inner and outer platforms, a pressure side wall extending between the inner and outer platforms, and suction and pressure side mate faces along, respectively, edges of the suction side wall and the pressure side wall, wherein when the first and second fiber-reinforced composite airfoil rings are brought together the suction side mate face of the first fiber-reinforced composite airfoil ring and the pressure side mate face of the second fiber-reinforced composite airfoil ring mate at an interface such that the suction side wall of the first fiber-reinforced composite airfoil ring and the pressure side wall of the second fiber-reinforced composite airfoil ring together form an airfoil that circumscribes an internal cavity, at least one of the suction or pressure side mate faces including protrusions along a trailing edge of the airfoil such that when the first and second fiber-reinforced composite airfoil rings are brought together the protrusions define a toothed exit slot through the trailing edge for emitting cooling air from the internal cavity.

11. The gas turbine engine as recited in claim 10, wherein the protrusions are exclusively on the pressure side mate face.

12. The gas turbine engine as recited in claim 10, wherein the protrusions are on both the suction and pressure side mate faces.

13. The gas turbine engine as recited in claim 12, wherein the protrusions on the suction side mate face are interdigitated with the protrusions on the pressure side mate face.

14. The gas turbine engine as recited in claim 10, wherein the protrusions have a rectangular cross-sectional geometry.

15. The gas turbine engine as recited in claim 10, wherein the protrusions have a rounded-off triangular cross-sectional geometry.

16. The gas turbine engine as recited in claim 10, wherein the suction and pressure side mate faces each taper at the trailing edge.

17. The gas turbine engine as recited in claim 10, wherein the first and second fiber-reinforced composite airfoil rings are arranged about an engine central axis, and the protrusions are axially elongated.

18. The gas turbine engine as recited in claim 10, wherein the first and second fiber-reinforced composite airfoil rings are arranged about an engine central axis, and the protrusions are axially tapered.

* * * * *